Dec. 8, 1959

E. A. HANYSZ ET AL 2,916,694

COATING THICKNESS GAGE

Filed March 2, 1956

INVENTORS.
Eugene A. Hanysz &
Roger L. Saur
BY
R. E. Fowler
ATTORNEY.

Dec. 8, 1959     E. A. HANYSZ ET AL     2,916,694
COATING THICKNESS GAGE

Filed March 2, 1956     3 Sheets-Sheet 3

INVENTORS.
Eugene A. Hanysz &
BY Roger L. Saur

R. E. Fowler
ATTORNEY.

United States Patent Office 2,916,694
Patented Dec. 8, 1959

2,916,694

COATING THICKNESS GAGE

Eugene A. Hanysz, Royal Oak, and Roger L. Saur, Detroit, Mich., assignors to General Motors Corporation, Detroit, Mich., a corporation of Delaware Application March 2, 1956, Serial No. 569,063

10 Claims. (Cl. 324—34)

This invention relates to measuring means and more specifically to nondestructive testing means for measuring the thickness of coatings or platings of one material on another.

It is desirable and often necessary to obtain a measurement of the thickness of a coat of paint or a plated metal area to determine whether the part or surface coating meets the specifications set up therefor.

It is therefore an object in making this invention to provide means to gage or measure the thickness of lamina of a composite part.

It is a further object in making this invention to provide nondestructive testing means for measuring the thickness of a coating or plating layer or layers on a base.

It is a still further object in making this invention to provide means for measuring the thickness of a thin layer of one material on a base by utilizing the change in loading on an oscillator-driven inductance coil.

With these and other objects in view which will become apparent as the specification proceeds, our invention will be best understood by reference to the following specification and claims and the illustrations in the accompanying drawings, in which:

Figure 1:
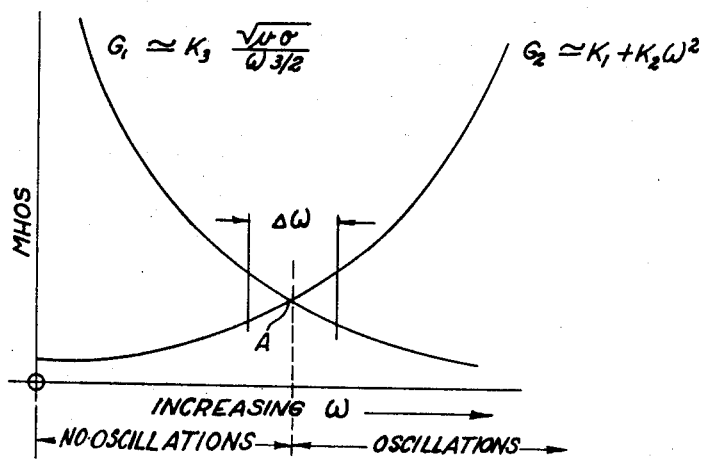
Figure 1 is a graph illustrating the theory of the selection of an operating frequency.

The present measuring system is based on the principle that alternating currents induced in a conductive material, "eddy currents" as they are known in the art, penetrate different distances depending on the frequency of the current in accordance with the equation:

$$i = I_0 e^{-\sqrt{\pi \mu \sigma f} x}$$

where $x$ = distance measured from the surface
$I_0$ = current at the surface
$i$ = current at $x$
$e$ = Naperian base
$\mu$ = permeability of the material
$\sigma$ = conductivity of the material
$f$ = frequency of the alternating current The depth of penetration is defined by the equation:

$$\delta = \frac{1}{\sqrt{\pi \mu \sigma f}}$$

The higher frequency, the less the current penetration and the more the tendency of the current to flow along the surface of the conductor or conductive area. This is known as the "skin effect." It is also apparent that the depth of penetration is affected by the material of the conductor and it can be shown that if one material is deposited on a second material having a different $\mu\sigma$ product, the depth of current penetration in the composite structure will vary in accordance with the thickness of the deposit. If an inductance coil fed by an alternating current source of power of the proper frequency is placed on a composite part having a plating or coating over a base, currents will be induced in the plating layer and into the base. If, through previous knowledge, the depth of current penetration as a function of frequency is known, an oscillator frequency may be selected which will insure penetration of the entire range of desired plating thicknesses under consideration. The probing coil may then be connected to the output of a tunable oscillator whose range includes the selected frequency and placed upon the plated surface. The oscillator may then be tuned over a particular frequency spectrum from a high frequency to a lower one. The induction of the higher frequency currents into the plating layer will cause less depth of penetration than the lower frequency currents. Hence the loading on the oscillator will gradually increase with decrease in frequency. Either some associated electronic circuits or the oscillator may be made sensitive to such a predetermined load, manifesting the instant that the critical load is exceeded in some manner. For example, the oscillator can be made to change its mode of operation. For different plating thicknesses of the same material combinations, the frequency at which the oscillator mode of operation changes will vary. Hence the means for tuning the frequency can be calibrated to read plating thickness. In order to make this change in load clearly perceptible, one embodiment of this system has been designed so that the oscillator changes from an oscillatory mode to a non-oscillatory condition or vice versa. By reading the tuning dial which may be calibrated in distance, the thickness of the layer under examination may be read.

The frequency band over which the power oscillator should be tunable will vary, depending upon the material upon which the device is to be used. As an example, it has been found that utilizing a band around 750 kc. to measure copper platings of the order of .001 of an inch on steel works satisfactorily. Nickel is a poorer conductor of current than copper, and it was found necessary to utilize a band in the neighborhood of 800 kc. for similar thickness nickel plating on steel. The higher frequency is necessary to limit the penetration in a material of poorer conductivity. Babbitt requires a very high frequency band around 21 mc. signal frequency to measure thicknesses of the order of .001 of an inch. This is because of its very poor conductivity.

The present system is based upon the theory of measuring a fixed load and varying the frequency to determine that frequency at which the fixed load occurs. It consists of an instrument which modulates or sweeps an oscillator frequency over a prescribed frequency range and which utilizes the change in the load on the tank circuit of the oscillator to change the operating mode of said oscillator to indicate the plating thickness. The system is so designed that this load change causes the oscillator to commence or cease oscillating, depending upon whether the frequency is being increased or decreased. The resultant signal provided by starting or stopping of the oscillator is applied to a cathode ray oscilloscope and the change from one condition to another produces a vertical mark or pip on the horizontal trace. The cathode ray tube may be calibrated to read thickness of a particular installation directly.

Referring to Figure 1, the graph therein shows the fundamental principle for obtaining the oscillatory-non-oscillatory conditions of a system including an oscillator and a tank circuit having a load. The curve $G_1$ represents the change in conductance in the tank circuit or load circuit as the frequency increases. It is noted that this curve falls off as the frequency increases; in other words, the conductance decreases as the frequency increases. On the other hand, the curve $G_2$ represents the change in conductance in the oscillator circuit as the frequency increases. $G_2$ shows an increase in conductance. The two curves cross at point A. At any frequency above A the negative conductance of the reactance oscillator exceeds the conductance of the tank circuit and the former will continue to oscillate, feeding the load. This is indicated by the defining words of Figure 1. At point A the two conductances are equal; however, below A the load conductance exceeds that of the reactance oscillator, which condition causes the oscillator to cease oscillating. This change in operating mode occurs at a frequency slightly below the critical frequency A.

The formula for $G_1$ is:

$$G_1 \simeq k_3 \frac{\sqrt{\mu\sigma}}{\omega^{3/2}}$$

where:

$k_3$ = a constant
$\mu$ = the permeability of the material
$\sigma$ = conductivity of material
$\omega$ = frequency Therefore, the conductance of the tank circuit varies directly with a variation in the permeability of the material and inversely as the frequency.

On the other hand:

$$g_2 \simeq k_1 + k_2 \omega^2$$

where:

$k_1$ = a constant
$k_2$ = a constant
$\omega$ = the frequency $G_2$ is therefore directly proportional to the square of the frequency. It is not affected by the material of the load.

For a particular installation the critical frequency A may therefore be determined by use of the above equations.

Figure 2:
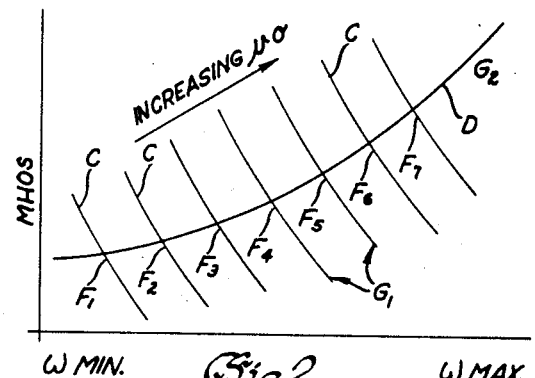
Figure 2 is a graph illustrating the effect of varying the total load on the frequency selection for operation.

Since, from the equation for $G_1$, it is clear that the product $\mu\sigma$ defines the horizontal position of the graph with respect to the axis of the $G_1$ curve, Figure 2 illustrates a family of curves for $G_1$ which result as the material under study varies in its characteristics. Each curve C intersects curve D for $G_2$ at a different point of frequency, $F_1$, $F_2$, $F_3$, $F_4$, $F_5$, $F_6$, and $F_7$, thus indicating the critical frequency at which a reactance oscillator will stop when used with particular materials.

Figure 3:
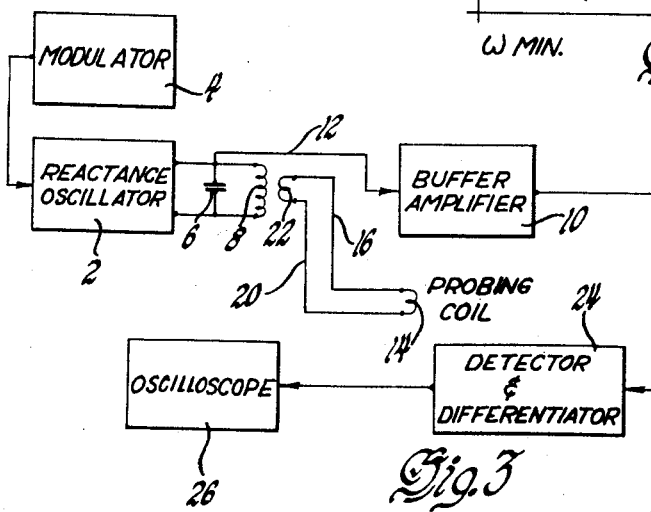
Figure 3 is a block diagram of a measuring system embodying our invention.

With this background, Figure 3 illustrates by block diagram the essential elements of a measuring system embodying our invention. The oscillator 2 is designed to oscillate over a band of frequencies determined as above described; for example, let it be assumed to be a band around 750 kc. A modulator 4 is connected to said oscillator to modulate the frequency thereof a given amount on both sides of the reference frequency. This is with the assumption that the material to be measured is in the neighborhood of .001 of an inch thick and is copper on steel. The oscillator tank circuit is shown as including a condenser 6 and an inductance 8. The tank circuit is connected to a buffer amplifier 10 through line 12. The probing coil 14 is connected to the tank circuit through lines 16 and 20 and coupling coil 22 in inductive relation with tank load coil 8. The output of the amplifier 10 is fed to a detector and differentiator 24 which in turn is connected to the oscilloscope 26. As the modulator sweeps the oscillator over the band of frequencies which includes a critical frequency of an estimated dimension in a known material, a signal will be developed in the amplifier due to the oscillator stopping or starting. The signal will be amplified and detected and applied to the oscilloscope 26 to give a vertical mark or pip. The repetitive modulation of the oscillator with the synchronized sweep of the oscilloscope causes a continuous trace on the face of the oscilloscope and the horizontal position of the pip indicates the thickness, and the distance may be calibrated.

The constants of the oscillator 2 are chosen so that it is capable of oscillating at frequencies both above and below the frequency that causes a depth of penetration equivalent to the thickness of the coating or plating which it is desired to measure. The modulator 4 is connected to sweep the oscillator over this band of frequencies. The tank circuit of the oscillator, which, it will be recalled, is that circuit in which the load is changed by the penetration of the induced current into the material being measured, includes the inductance 8, to which is coupled the probing coil 14 by a low impedance coupling through coil 22. As the frequency of the oscillator decreases, the current penetration into the coating of the part induced by the coil 14 increases, and when it penetrates through the thickness of the coating, the load on the coil and the tank circuit connected thereto changes and the oscillator will stop. This change in the oscillator output produces a pulse which is applied to the buffer amplifier 10 and the detector 24, the output of the latter being applied directly to the vertical plates of the oscilloscope to produce an indicating pip on the screen. The oscilloscope sweep is synchronized with the modulator so that one horizontal sweep trace is produced for each cycle of modulation of the modulator. Thus repetitive traces are produced with a vertical pip located along the horizontal trace whose position indicates the thickness of the coating.

Figure 4:
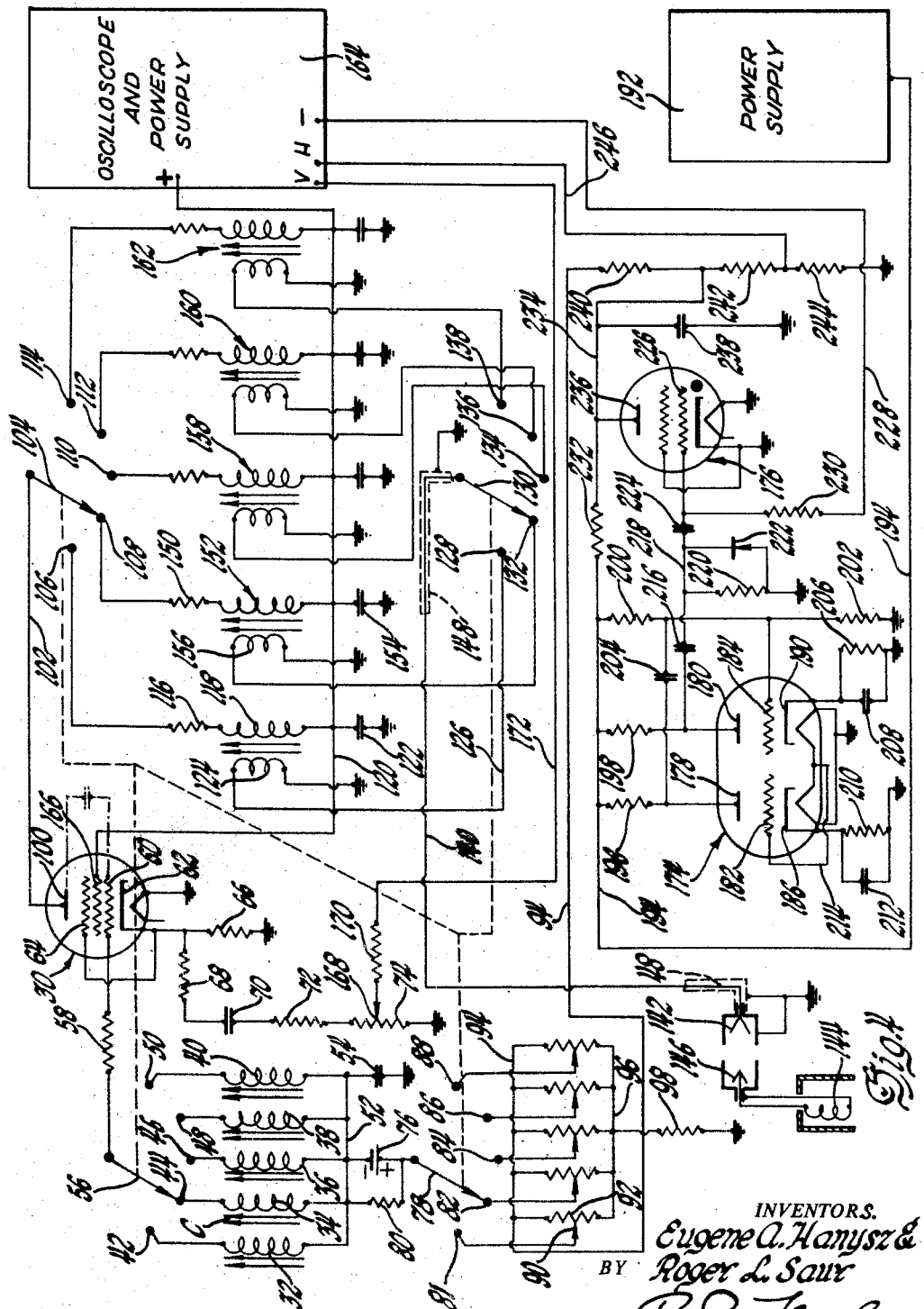
Figure 4 is a circuit diagram of a measuring system embodying our invention, parts being shown in block diagram form.

Rather than to have to provide different oscillators for different thickness ranges of material or for different materials of the same thickness, a single oscillator tube may be provided with a plurality of reactance oscillator circuits and a plurality of matching tank load circuits having different values so that several ranges may be supplied by merely simultaneously switching the two. Figure 4 illustrates such a system. There is shown therein a testing device having five different ranges, and therefore capable of being used for either differing materials or differing thickness ranges. The reactance oscillator tube 30 has its reactance input circuit defined by any one of a plurality of inductance coils 32, 34, 36, 38 and 40, connected to stationary switch contacts 42, 44, 46, 48 and 50 respectively. The opposite ends of each of the inductance coils 32 through 40 are commonly connected to line 52 which is connected to ground through condenser 54. A movable switch arm 56, which may be moved into contact with any one of the stationary contacts 42 through 50 is connected through a dropping resistor 58 to the control grid 60 of tube 30.

The cathode 62 of the tube 30 is directly connected to the suppressor grid 64 of the tube, and likewise through biasing resistor 66 to ground. The cathode is also connected through a further resistor 68 in series with a filtering condenser 70 and two series resistances 72 and 74 to ground. Common line 52 is connected through a biasing battery 76 to a movable switch arm 78 and a shunting resistor 80 is connected around the biasing battery. The biasing battery 76 is supplied to maintain the grid negative with respect to the cathode under operating conditions. Movable arm 78 is adapted to engage a series of stationary contacts 81, 82, 84, 86 and 88, each of which is connected to a variable tap 90 on a resistance 92 in order to provide differing amounts of modulating signal. The upper end of each of the resistors 92 is commonly connected to line 94 which extends to the sweep generator and is the line upon which the modulating signal is applied. Conversely, the opposite end of each of the resistances 92 is commonly connected to a line 96, which line is connected to ground through grid return resistor 98.

The plate 100 of the oscillator tube 30 is connected through line 102 with movable switch arm 104 which is adapted to engage a plurality of stationary contacts 106, 108, 110, 112 and 114. To these taps are connected the various tank or load circuits adapted to be coupled to the probing coil. Thus a resistance 116 and an industance 118 are connected in series between contact 106 and line 120. A radio frequency bypass condenser 122 is connected between line 120 at the first station and ground. Coil 118, therefore, is the tank inductance for the first section. Inductively coupled to coil 118 is a low impedance coil 124, one end of which is grounded and the opposite end of which is connected through line 126 to sationary contact 128 on a further multiple contact switch. The movable switch arm 130 is adapted to move over a plurality of stationary contacts 128, 132, 134, 136 and 138, which are each in circuit with various tank circuits of the oscillator. The arm 130 is connected through line 140 with the center conductor of the plug-in receptacle 142. A probe coil 144 is energized by the oscillatory signal on line 140 through plug 146, which mates with the receptacle 142. The line 140 is enclosed in a grounded shield 148.

The second tank circuit, the components of which have different values from the first, includes a resistance 150, transformer coil 152, and radio frequency bypass condenser 154, connected in series between switch contact 108 and ground. A coupling coil 156 is mounted on the same core as coil 152 and is connected to stationary contact 132 of the selector switch 130. Similar tank and coupling circuits of differing values for different materials or dimensional ranges are similarly connected to switch contacts 110, 112 and 114, and to contacts 134, 136 and 138. These tank circuits are identified generally as 158, 160 and 162 respectively. While a plurality of condensers such as 122 and 154 are shown in spaced relation between different portions of line 120 and ground, a single condenser of the proper size may be substituted if desired.

An oscilloscope and power supply therefor are identified by the block diagram 164. Line 120 is connected to the power supply section of the oscilloscope to provide a voltage therefor. Screen grid 166 of tube 30 is connected to line 120. A variable tap 168, movable over resistance 74, is connected through resistor 170 to line 172 which in turn is connected to the vertical amplifier of the oscilloscope at the terminal marked V on the oscilloscope housing. Through this line the indicating signal is applied and it provides the vertical indication on the trace for measurement. Movement of the tap 168 varies the amplitude of the signal applied to the oscilloscope and therefore regulates the sensitivity of the system. By taking the signal off the oscillator in this manner, the oscillator plate current is isolated from the potentiometer formed of resistors 72 and 74 and a more regulated signal is obtained.

A modulating sawtooth wave is generated to sweep the oscillator over a desired band of frequencies. Frequency shift of the oscillator can be affected electronically by changing the potential of control grid 60. This changes the trans-conductance $g_m$ of the tube which changes the effective value of the grid-to-plate capacitance. In the analysis of the reactance tube, it is found that the grid-to-plate capacitance (illustratively shown in dotted lines in tube 30) is one of the elements which controls the resonant frequency of the oscillator. The means for generating the sawtooth modulating wave is also used as a sweep generator for the synchronized horizontal trace of the oscilloscope. This generator includes two tubes, 174 and 176.

The first tube is a duo-triode having plates 178 and 180, grids 182 and 184, and cathodes 186 and 190. A separate power supply section 192 is provided for this generator section, the output of which is connected to supply line 194. The plates 178 and 180 are connected to the power supply line 194 through load resistors 196 and 198 respectively. A potential divider consisting of resistors 200 and 202 in series is connected between line 194 and ground. A condenser 204 is connected between plate 178 and a point intermediate resistors 202 and 200. Grid 184 of the second triode section is connected to the same point. Cathode 190 is connected to ground through biasing resistor 206, shunted by condenser 208. In similar manner cathode 186 is connected to ground through biasing resistor 210 shunted by condenser 212. Control grid 182 of the first section is connected to the filament supply line 214 which may be connected to any suitable source of alternating current such for example as 60 cycle commercial power. This section forms a square wave pulse generator oscillating at the frequency of the filament supply current.

The square wave output of the pulse generator arriving from plate 180 is differentiated by the R-C network made up of resistance 220 and capacitance 216. Thus on line 218 there appears a series of alternate positive and negative spikes representing respectively the differentiated leading and lagging edges of the square wave. By placing rectifier 222 across resistance 220 with proper polarity, the negative voltage spike can be shorted out, leaving only positive voltage pulses on the line 218. These voltage pulses are applied through condenser 224 to control grid 226 of gas tube 176, which is permanently biased to cutoff through resistor 230 and line 228 coming from the power supply in the oscilloscope, indicated as minus (—). Condenser 224 prevents the permanent bias on grid 226 from being short circuited through rectifier 222 as it blocks D.C. voltage. The biasing voltage on line 228 may, for example, be —40 volts, which prevents the tube 176 from conducting in the absence of a positive pulse on line 218.

The power supply line 194 is likewise connected to a resistance 232, the other terminal of which is connected by line 234 with the plate 236 of the tube 176, with one terminal of condenser 238, and to an intermediate point between resistors 240 and 242 which form part of a voltage divider. A resistor 244 is connected in series between resistor 242 and ground, and completes the voltage divider connected between line 94 and ground. As previously mentioned, this generator section provides a sawtooth wave on line 94 to modulate the oscillator over a desired band and also to produce a synchronizing pulse on line 246 which extends from a point between resistors 242 and 244 to the synchronizing sweep control H of the oscilloscope. In providing the sawtooth wave to the potential divider, the condenser 238, whose remaining terminal is grounded, is alternately charged and discharged. When it is in a discharged state, it is charged through current flow from the power line 194 through limiting resistance 232. When it reaches a point near full charge, the potential on the control grid 226, applied by a pulse from the pulse generator 174, will cause the thyratron tube 176 to conduct. Up to the point of tube conduction the voltage on the voltage divider 240, 242, 244 gradually increases to a maximum. When the tube conducts, the condenser 238 quickly discharges therethrough to ground and the voltage on the potential divider drops sharply. The next half cycle causes the thyratron to cut off due to the high negative bias on line 228 and the condenser 238 again charges and the voltage potential across the divider increases. This operation causes an alternate voltage increase and decrease producing a sawtooth wave form of voltage on line 94 at the pulse frequency which is that of the supply voltage.

In operating this equipment, it is desired to point out that there are a plurality of control switches, all of which are mechanically interconnected so that they are simultaneously moved to different switch points and thus provide for operation on different materials or over different dimensions. This is shown by the dotted lines interconnecting switch arms 56, 78, 104 and 130.

Assuming that it is desired to operate the device on the frequency defining and tank circuits connected to the second set of terminals, the apparatus is adjusted as follows: the probe 144 is placed on the surface to be inspected and whose plated thickness dimension is known. The core C of the grid inductance 34 is adjusted until the oscillator ceases to oscillate within the range swept by the modulator. At this point it should be pointed out that in this case the frequency is swept from a high frequency to a lower one, and therefore the oscillator proceeds from an oscillatory condition at the high frequency end to a non-oscillatory at the lower frequency. Having adjusted the oscillator so that it sweeps a band within which the condition of the oscillator changes for the given laminar thickness, the operator next selects a second sample of laminar material which is known to have a greater thickness, the two samples providing tolerance limits, and again adjusts core C with the device operating until a signal is obtained at this second thickness, the signal of course being produced by the oscillator becoming non-oscillatory from an oscillatory state. The operator then returns to the first sample to see if it is still within the range of modulation of the oscillator at this new core setting. If it is, then both limits of a laminar thickness which is satisfactory are within the range of the instrument and it is now correctly calibrated for use on these particular materials for testing the given thicknesses. If upon returning to the first sample it is found that a signal is not obtainable, then the adjustable tap 90 on the second potentiometer connected to switch point 82 is adjusted to give a higher amplitude to the sawtooth modulating wave to widen the frequency band until both signals appear within the modulating range. When that occurs, the device is ready for operation and the operator merely applies the probe to the surface of samples being tested for laminar thickness, and if a signal is obtained on each, as indicated by the oscilloscope trace, then the laminar thickness is within proper limits.

The oscillator changing from a non-oscillatory to an oscillating condition, or vice versa, produces a change in the voltage across resistor 74, which voltage is applied to the vertical plates of the oscilloscope, and therefore produces a step wave when the oscilloscope is synchronized with the synchronous generator voltage tapped off between resistors 242 and 244. If the size of the resultant signal on the oscilloscope is too small, tap 168 may be adjusted to increase the sensitivity of response and obtain a larger and more easily read signal. The face of the oscilloscope may be calibrated in thickness from empirically determining the thicknesses being tested. In like manner the ganged control switches may be moved to other positions and the associated cores C adjusted for other materials and for other dimensional ranges, and the device therefore can be set up for a plurality of different situations and can quickly be changed from one to another for any one of the fixed materials and/or dimensional ranges.

Figure 5:
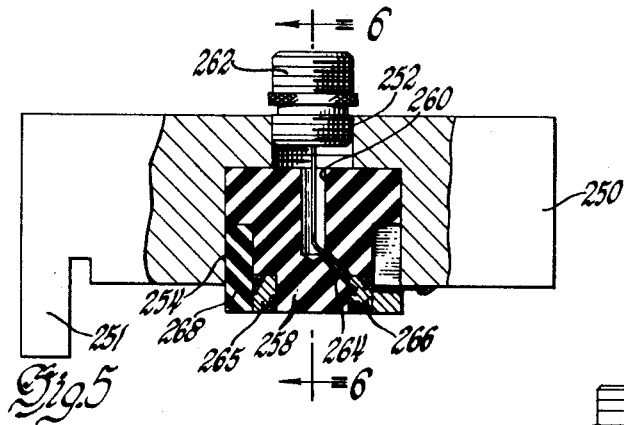
Figure 5 is a side elevation of a probing coil assembly to be used with the system, parts being broken away and shown in section.
Figure 6:
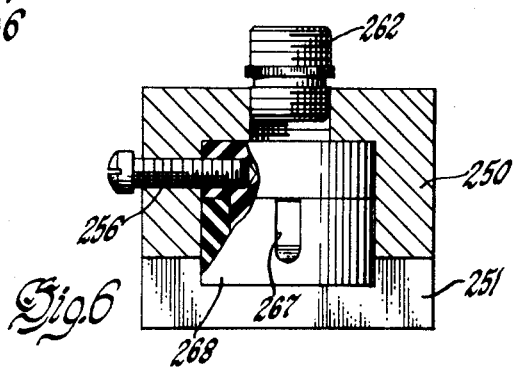
Figure 6 is a sectional view taken on line 6—6 of Figure 5.
Figure 7:
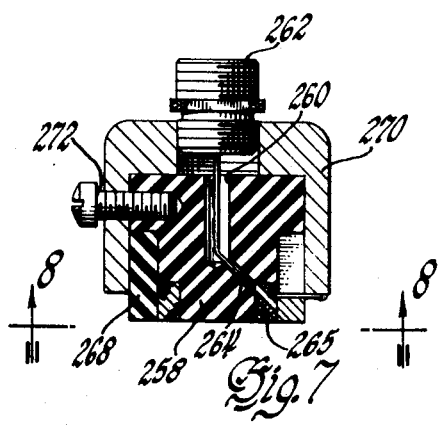
Figure 7 is a vertical sectional view taken through a modified form of coil cover shield and support.
Figure 8:
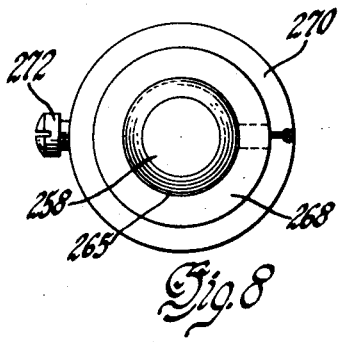
Figure 8 is a bottom view of the shield and support taken on line 8—8 of Figure 7.

The probe itself is shown in two forms, the first being illustrated by Figures 5 and 6, and a second modified form in Figures 7 and 8. Since relatively high frequencies are used, it is necessary to shield the inductance winding in order to obtain satisfactory readings. That form shown in Figures 5 and 6 includes a main shield 250 which is made of a material having good electrical conducting quality such for example as copper. This housing or shield includes an opening 252 therethrough of one diameter connected to a larger bore 254 adjacent the lower face. Into this opening the main probe assembly is inserted and held tightly therein by a set screw 256. The inductance support per se includes a body portion 258 which is formed of an insulating material such as polystyrene. A central bore 260 is provided in the body 258 through which connections to the coil may be made. A coupling 262 is rigidly secured to the upper surface of the body 258 which proceeds through the opening 252 in the housing 250, and is threaded to be coupled to the conductive shielded line 140 coming from the tank circuits. The central bore 260 is connected to a diagonal channel 264 which extends to an annular cavity 266. A wire affixed to the center conductor of the coupling 262 threads through channels 260 and 264 and is wound a predetermined number of turns around the insulating body 258 as shown at 265. This, then, is the actual probing inductance. The free end of the wire is brought out through opening 267 in a polystyrene shield 268 and soldered to the housing 250, which, through the outer diameter of coupling 262 and the shield of the interconnecting cable between 262 and receptacle 142 is returned to ground and completes the electrical circuit. The main housing 250 has an indexing lip 251 and is adapted to be used when applying the probe to curved bearing surfaces.

The second form of probe coil, which is shown in Figures 7 and 8, consists of the same coil support 258 around the lower annular periphery of which the test coil assembly 265 is mounted, but in this instance the shield or cover assumes the form of an annular cap 270 which fits over the top of the member 258 and is secured thereto through a set screw 272 which extends through the shoulder of the cap and into the body 258. This shield is also of good conductivity material and may be, for example, copper. Body 258 is as before formed of an insulating material such as polystyrene, and the coil assembly 265 may be molded in place by filling the cavity with insulating material after the wires are wound around the lower end of the body 258. As before, the electrical connections to the coil may be made through duct 264 and bore 260. This type of mounting for the probe coil is to be used on flat surfaces. Other shapes of housing may be used to apply the probe coil at right angles to the surface to be tested.

We claim:

1. In measuring means, an oscillator including an electron device having a control electrode and an input circuit connected to the control electrode and an output circuit, said oscillator being tunable over a frequency range by varying the voltage on the control electrode, inductive means connected to the output circuit including a test inductance in which the loading may be changed, means connected to the input circuit for repetitively cyclically changing the voltage on the control electrode for modulating the oscillator over a prescribed frequency band, and adjustable means in said input circuit for varying the band of modulation so that the oscillator will change from oscillatory to non-oscillatory condition within a range of modulation at prescribed loading changes in the test inductance.

2. In measuring means, an oscillator including an electron device having a control electrode and an input circuit connected to the control electrode and an output circuit, said oscillator being tunable over a frequency range by varying the voltage on the control electrode, means for generating a sawtooth wave form of voltage connected to the input circuit to vary the oscillator frequency, a tank circuit including inductance means connected in the output circuit, a probing coil inductively coupled to the inductance in the tank circuit and adapted to be associated with a laminar device to be tested, the inductance of said laminar device as reflected in the probe coil varying the loading in the tank circuit and causing the oscillator to change from an oscillatory to a non-oscillatory condition.

3. In measuring means, an oscillator including an electron device having a control electrode and an input circuit connected to the control electrode and output circuit, said oscillator being tunable over a frequency range by varying the voltage on the control electrode, means for generating a sawtooth wave form of voltage connected to the input circuit to vary the frequency of the oscillator, means in this connection to adjust the amplitude of the sawtooth voltage to adjust the frequency range, a tank circuit connected to the oscillator output, an inductance probing coil inductively coupled to the tank circuit and adapted to be placed in juxtaposition to the surface of a laminated body so that as the frequency of the oscillator varies over a band as prescribed by the modulator, the penetration of the current induced in the laminated body will vary, changing the loading on the tank circuit, and causing the oscillator to change from an oscillatory to a non-oscillatory state.

4. In measuring means, an oscillator including an electron device having a control electrode and an input circuit connected to the control electrode and an output circuit, said oscillator being tunable over a frequency range by varying the voltage on the control electrode, means for generating a sawtooth wave form of voltage connected to the input circuit to vary the frequency of the oscillator, means in this connection to adjust the amplitude of the sawtooth voltage to adjust the frequency range, a tank circuit connected to the oscillator output, an inductance probing coil inductively coupled to the tank circuit and adapted to be placed in juxtaposition to the surface of a laminated body so that as the frequency of the oscillator varies over a band as prescribed by the modulator, the penetration of the current induced in the laminated body will vary, changing the loading on the tank circuit as the laminar boundary is reached, and causing the oscillator to change from an oscillatory to a non-oscillatory state at that point, an oscilloscope, and means for connecting the oscillator output to the oscilloscope to indicate the condition thereof as an indication of the penetration of induced current to the lamination boundary.

5. In measuring means, an oscillator including an electron device having a control electrode and an input circuit connected to the control electrode and an output circuit, said oscillator being tunable over a frequency range by varying the voltage on the control electrode, means for generating a sawtooth wave form of voltage connected to the input circuit to vary the frequency of the oscillator, means in this connection to adjust the amplitude of the sawtooth voltage to adjust the frequency range, a tank circuit connected to the oscillator output, an inductance probing coil inductively coupled to the tank circuit and adapted to be placed in juxtaposition to the surface of a laminated body so that as the frequency of the oscillator varies over a range as prescribed by the modulator, the penetration of the current induced in the laminated body will vary, changing the loading on the tank circuit at a laminar boundary, and cause the oscillator to change from an oscillatory to a non-oscillatory state at that point, an oscilloscope, means for connecting the oscillator output to the oscilloscope to indicate the condition thereof as an indication of the penetration of induced current in the laminated body to a boundary, and means interconnecting the means for generating the sawtooth wave and the synchronizing circuit of the oscilloscope to control the horizontal sweep in synchronism with the modulation of the oscillator.

6. In measuring means, an oscillator including an electron device having a control electrode and an input circuit connected to the control electrode and an output circuit, said oscillator being tunable over a frequency range by varying the voltage on the control electrode, means for generating a sawtooth wave form of voltage connected to the input circuit to vary the frequency of the oscillator, means in this connection to adjust the amplitude of the sawtooth voltage to adjust the frequency range, a tank circuit connected to the oscillator output, an inductance probing coil inductively coupled to the tank circuit and adapted to be placed in juxtaposition to the surface of a laminated body so that as the frequency of the oscillator varies over a range as prescribed by the modulator, the penetration of the current induced in the laminated body will vary, changing the loading on the tank circuit at a laminar boundary, and causing the oscillator to change from an oscillatory to a non-oscillatory state at that point, and indicating means connected to the oscillator and to the means for generating the sawtooth wave form to indicate the change from oscillatory to non-oscillatory state synchronized with the frequency scanning.

7. Measuring apparatus of the character described, including, means for generating electromagnetic waves which may be tuned by varying the input voltage, modulating means connected to said wave generating means to vary the input voltage for cyclically varying the frequency of said generated waves over a predetermined band, an output circuit connected to said wave generating means, said circuit including an output impedance, a test head including a test impedance adapted to be placed closely adjacent a laminar part to be tested, said test impedance being coupled to the output impedance to load said output impedance and change the mode of operation of the wave generating means as the current induced in said laminar part changes and extends into different strata thereof.

8. Measuring apparatus of the character described, including, means for generating electromagnetic waves which may be tuned by varying the input voltage, modulating means connected to said wave generating means to vary the input voltage for cyclically varying the frequency of said generated waves over a predetermined band, an output circuit connected to said wave generating means including an output inductance, a test head including a test inductance adapted to be placed closely adjacent a laminar part to be tested, said test inductance being coupled to the output inductance to load said inductance and change the load on the wave generating means as the current induced in said laminar part changes and extends into different strata thereof.

9. In measuring means for determining the thickness of laminar layers, an oscillator whose frequency may be varied by changing the input voltage having a plurality of tunable input circuits and a plurality of tunable output circuits, a source of sawtooth wave voltage, a plurality of adjustable potentiometer means individually connectable to each tunable input circuit and to the source of sawtooth wave voltage to adjust the range, a probing inductance adapted to be placed adjacent a laminated body to measure the lamina thickness selectively connectable with each tunable output circuit and common ganged switching means in the connections between the tunable input circuits and the oscillator, the tunable output circuits and the oscillator, the adjustable potentiometer means and the tunable input circuits and the probing inductance and the tunable output circuits so that the device may be switched to accommodate different materials and thickness ranges.

10. In measuring means for determining the thickness of laminar layers, an oscillator whose frequency may be varied by changing the input voltage having a plurality of tunable input circuits and a plurality of tunable output circuits, a source of sawtooth wave voltage, a plurality of adjustable potentiometer means individually connectable to each tunable input circuit and to the source of sawtooth wave voltage to adjust the range, a probing inductance adapted to be placed adjacent a laminated body to measure the lamina thickness selectively connectable with each tunable output circuit, common ganged switching means in the connections between the tunable input circuits and the oscillator, the tunable output circuits and the oscillator, the adjustable potentiometer means and the tunable input circuits and the probing inductance and the tunable output circuits so that the device may be switched to accommodate different materials and thickness ranges, oscilloscope means having vertical and horizontal deflecting means, and conductor means connecting the oscillator output with the vertical deflecting means and the source of sawtooth wave voltage to the horizontal deflecting means to indicate the laminar thickness.

References Cited in the file of this patent

UNITED STATES PATENTS

| | | |
|---|---|---|
| 2,477,384 | Mann et al. | July 26, 1949 |
| 2,524,290 | Hershberger | Oct. 3, 1950 |
| 2,564,777 | Cavanagh | Aug. 21, 1951 |
| 2,576,173 | Cornelius | Nov. 27, 1951 |
| 2,630,780 | Falck | Mar. 10, 1953 |
| 2,660,704 | Harmon et al. | Nov. 24, 1953 |

FOREIGN PATENTS

| | | |
|---|---|---|
| 596,182 | Great Britain | Dec. 30, 1947 |

OTHER REFERENCES

Article: Eddy Current Type Flaw Detectors for Non-Magnetic Metals, Journal of Applied Physics; June 1942, pp. 377–378.